Oct. 16, 1934.　　　C. F. M. VAN BERKEL　　　1,976,865
STACKER
Filed Oct. 19, 1931　　　4 Sheets-Sheet 1

Inventor:
Cornelis F.M. Van Berkel
By Cheever Cox + Moore
Attys.

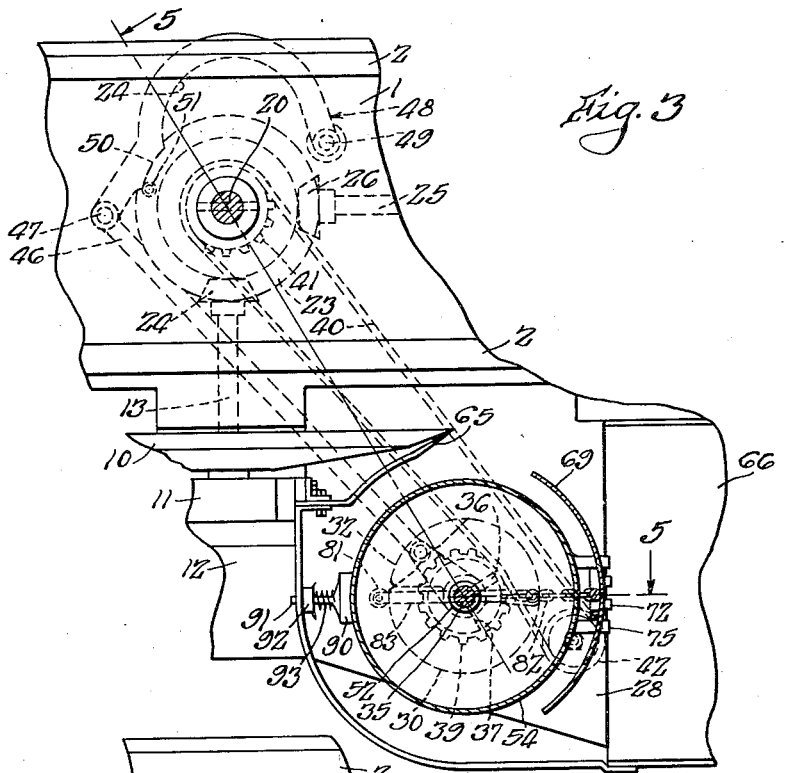

Oct. 16, 1934.    C. F. M. VAN BERKEL    1,976,865
STACKER
Filed Oct. 19, 1931    4 Sheets-Sheet 3

Inventor:
Cornelis F. M. Van Berkel
By Cheever Fox & Moore
Attys.

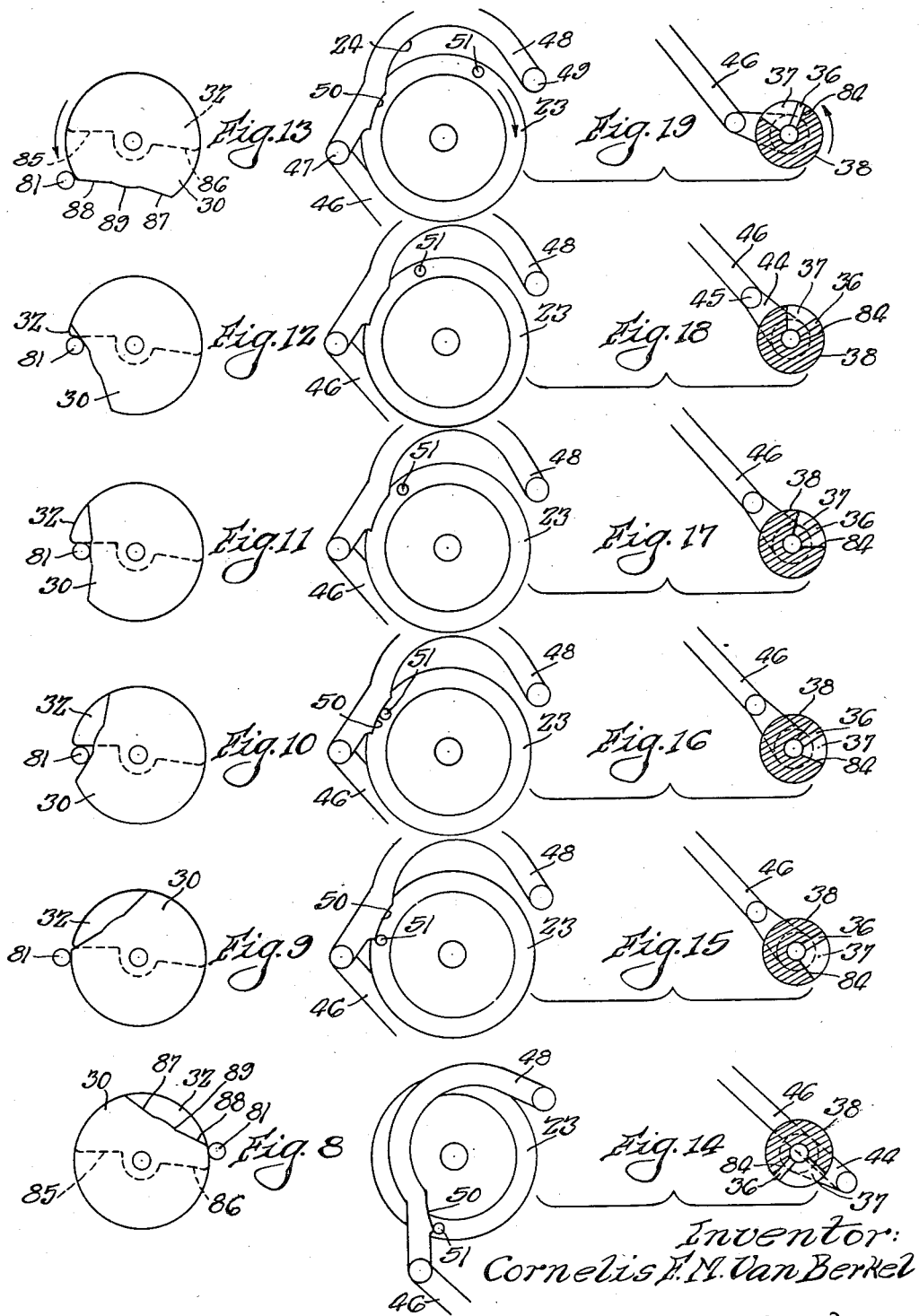

Patented Oct. 16, 1934

1,976,865

UNITED STATES PATENT OFFICE 1,976,865

STACKER

Cornelis F. M. van Berkel, Wassenaar, Netherlands, assignor to U. S. Slicing Machine Company, La Porte, Ind., a corporation of Indiana Application October 19, 1931, Serial No. 569,604
In Great Britain October 22, 1930

19 Claims. (Cl. 146—94)

The present invention relates to slicing machines and particularly to a means for conveying slices away from the knife after they have been formed and for depositing the slices in uniform stacks on a slice receiving plate. One form of conveying and stacking means is shown in the copending application of Wilhelmus Adrianus van Berkel, Serial No. 547,409, filed June 27, 1931.

The present invention has for its object an improvement in the device shown in said co-pending application, and my improvement consists mainly in providing a device in which the slice comes to rest before being discharged onto the slice receiving plate. In order to do this, the slice conveyer is brought to rest at a slice discharge position, and a fly is provided for discharging the slice from said conveyer. The fly in the embodiment shown moves with the conveyer but this is not a necessary arrangement.

More specifically, the conveyer comprises a drum which carries a plurality of slice engaging and holding prongs onto which the slice is pressed as it is formed by the slicing knife of the slicing machine, and means is provided whereby the drum is rotated first at a speed substantially equal to the speeed of movement of the table upon which the substance is supported and during the time the slice is being formed, next with an accelerated movement to bring the slice into slice discharging position, and finally temporarily stopped while the slice is discharged, this cycle of operation being repeated on each rotation of the drum.

This invention is particularly applicable to a conveying and stacking mechanism in which the discharge fly is coupled by the conveyer and moves bodily therewith, although not being limited to such a construction.

Another object of this invention is to provide a novel cam means for actuating the discharge fly at the proper time. This novel construction is used primarily for the reason that due to the different speeds of the conveyer, an ordinary cam will not suffice to actuate the discharge fly.

In the drawings:

Fig. 3 is a view similar to Fig. 2 showing parts in cross section, and with the fly in a position ready to discharge the slice.

Fig. 4 is a view similar to Fig. 3 showing the parts in the position which they occupy just after the slice has been received by the conveyer and as the conveyer is just about to begin its accelerated movement to discharge position.

Figure 1:
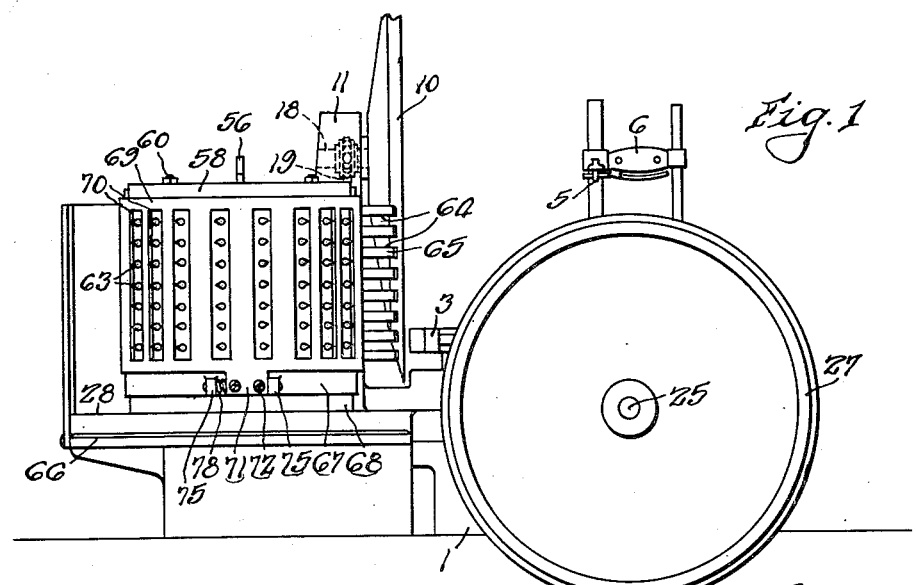
Fig. 1 represents an end elevation of a device embodying my invention.

Figs. 8 to 13 inclusive show the various positions occupied by the cams which actuate the fly for the stacker, and Figs. 14 to 19 inclusive show the corresponding positions of the two driving means which drive the stacker.

The slicing machine comprises a base member 1, having guides 2, upon which the carriage 3 reciprocates as in the usual construction for this type of slicing machine. The carriage 3 is provided with a feed plate 4 having a clamp 5 thereon, provided with an operating handle 6 and a feed screw 7 operated by a pawl and ratchet connections 8 and 9 of any well known construction, which cooperates with a nut 10' on the feed plate 4 to move the feed plate toward the cutting plane of the knife. The knife 10 is rotatably mounted in a bearing bracket 11 on a bracket 12 carried by the base.

A shaft 13 extending into the base 1 and into the bracket 12, has a pulley 14 secured thereto over which a belt 15, driven from the pulley 16 on the shaft of the motor 17, is trained. Rotation of the motor will rotate the shaft 13. The shaft 13 also has a sprocket thereon, and this sprocket is mounted directly below a similar sprocket on the spindle 18, which supports the knife 10. A chain 19 trained over the sprocket on the shaft 18, and the sprocket on the shaft 13, is used to impart rotation to the knife when the motor is operating. A vertically extending stub shaft 20, which extends above and below the upper surface of the base 1, has a crank 21 secured thereto above the surface of the base, and a pitman 22 pivoted to the crank 21 and to the under side of the carriage 3 is used to reciprocate the carriage 3 as the shaft 20 is rotated. To the lower end of the shaft 20 there is secured a bevel gear 23 which meshes with a bevel gear 24 on the shaft 13, which latter shaft as previously described is driven from the motor 17. There is also a shaft 25 suitably journaled in the base, provided with a bevel gear 26 meshing with the bevel gear 23. The shaft also has a fly wheel 27 secured thereto and this fly wheel acts as a stabilizing device for the driving of the table and may be equipped with a handle for manual operation if it is desired not to use the motor drive shown in the drawings. The drive from the motor to the shaft 13, as shown, is more or less conventional it being understood that usually in a device of this nature a change speed mechanism is nesessary or desirable to drive the shaft 13 at a relatively slow rate as compared to the speed of rotation of the motor.

To one side of the base 1, there is secured a stacker supporting bracket 28, which bracket rotatably supports the sleeve 29, having the cam 30 formed integrally therewith, the sleeve 29 also being journaled to rotate within a bearing portion 31 formed integrally with the cam 32, concentrically mounted with respect to the cam 30. The cam 32 is secured by the bolts 33 which extend through the base 28 and are threaded into the flange 34 on the bearing portion 31. In other words, the cam 32 is held stationary while the cam 30 rotates with respect thereto. The drum supporting shaft 35 is rotatable within the sleeve 29 and has a pin 36 extending through a slot 37 which is formed in an enlarged portion 38 on the sleeve 29. The slot permits relative rotation between the shaft 35 and the enlarged portion 38. Since the slot extends about 90 degrees in a peripheral direction about the enlarged portion 38, a relative movement between the shaft 35 and sleeve 29 of substantially 90 degrees is permitted.

The enlarged portion 38 has a sprocket 39 secured thereto, and this sprocket engages a run of the chain 40 which is trained over the driving sprocket 41 secured to the shaft 20, and a guide pulley 42 mounted to rotate on a shaft 43 extending downwardly from the under side of the bracket 28. Since the shaft 20 is rotating continuously, a continuous rotation is imparted to the enlarged portion 38 and to the sleeve 29 and cam 30. The shaft 35 has a crank arm 44 secured to the lower end thereof, and is pivotally connected at 45 to a link 46, which in turn is pivoted at 47 to the end of the cam arm 48, pivoted at 49 to the under side of the base 1. This cam arm has a cam surface 50 adapted to be engaged by the roller 51 on the under side of the gear 23, and a recessed portion 24 which permits the cam arm 48 to move into the position illustrated by dotted lines in Fig. 4 when the cam surface 50 is not engaged by the roller 51. The roller 51 engages the cam surface 50 through somewhat less than 180 degrees of the revolution of the gear 23. The shaft 35 has secured thereto a sleeve 52, having a drum supporting plate 53 upon which the cylindrical drum 54 rests, the drum having a pin 55 secured thereto and adapted to enter an opening in the plate 53 to locate the drum in proper relation to the plate and to the shaft 35. A latch 56 pivoted within a recess in the upper end of the shaft 35 is spring pressed by a spring 57 into the position shown in Fig. 5, and in this position, the latch has a portion which overlies the upper surface of the drum 54 and prevents the upward movement of the drum except when the latch 56 is released manually.

The drum 54 has a cylindrical prong supporting member 58 secured thereto by means of bolts 60 passing through slots 61 in a flange 59 integrally formed on the cylindrical prong supporting member 58. The lower end of the cylindrical member is held in spaced relation to the drum by an abutment 62 extending inwardly from the prong supporting member 58.

A plurality of prongs 63 are secured to the outer surface of the member 58 and these prongs are adapted to pass through slots 64 provided in the deflector 65 which deflects the slices as they are cut by the knife. As the drum 54 rotates, the prongs are carried into a position adjacent the knife at about the time the slice is beginning to be formed, and the prongs are pressed into the substance as they pass through the slots in a well known manner. In ths way, the slices are conveyed away from the slice deflector by the prongs 63 and into a position to be discharged on a slice receiving surface 66 extending to one side of the base 1 and toward the operator's side of the machine, which side is the right hand side shown in Fig. 2.

The lower end of the outer cylindrical surface of the drum 54 extends downwardly to form a skirt 67, and this skirt embraces a cylindrical sleeve 68 secured to the bracket 28 to enclose the operating parts of the mechanism and prevent the accumulation of foreign matter upon the cams and the operating means enclosed within the drum 54 and sleeve 68.

Figure 2:
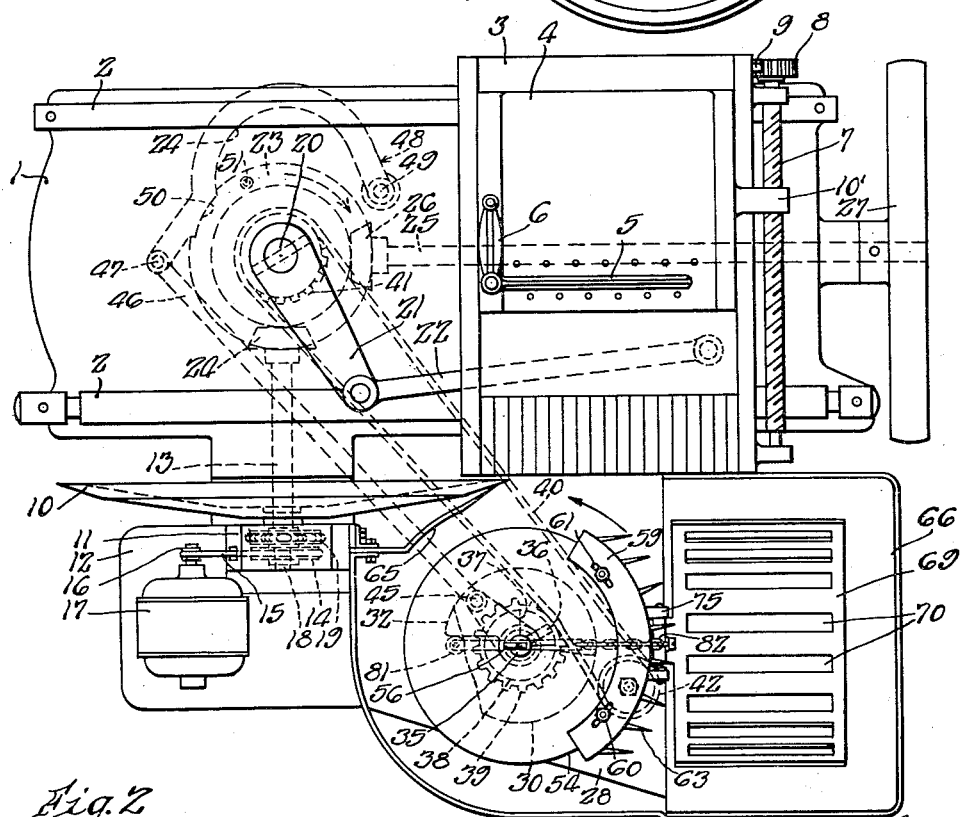
Fig. 2 is a plan view of the device shown in Fig. 1, with the fly in discharge position and ready to resume its normal position shown in Fig. 1.
Figure 5:
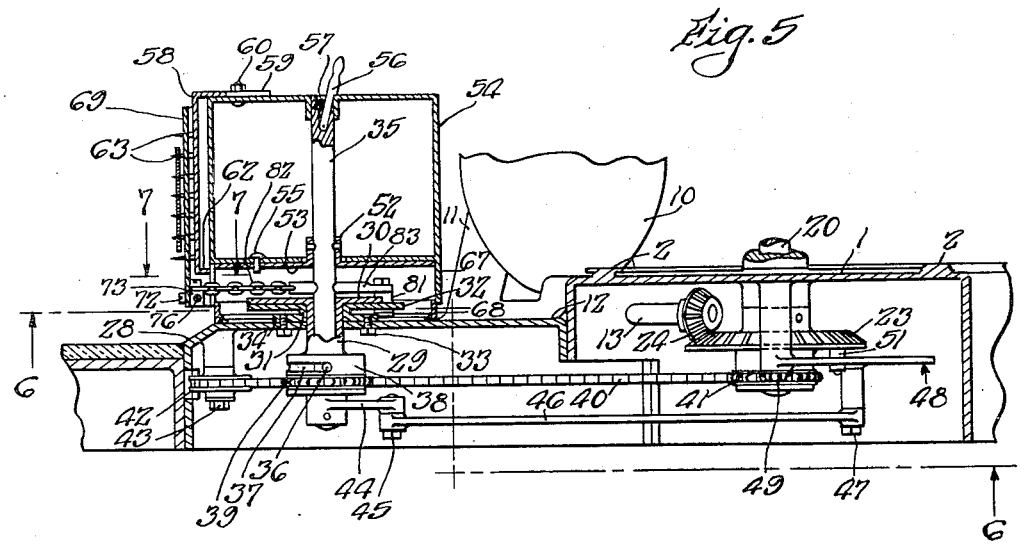
Fig. 5 is a cross section taken substantially along the line 5—5 of Fig. 3.
Figure 6:
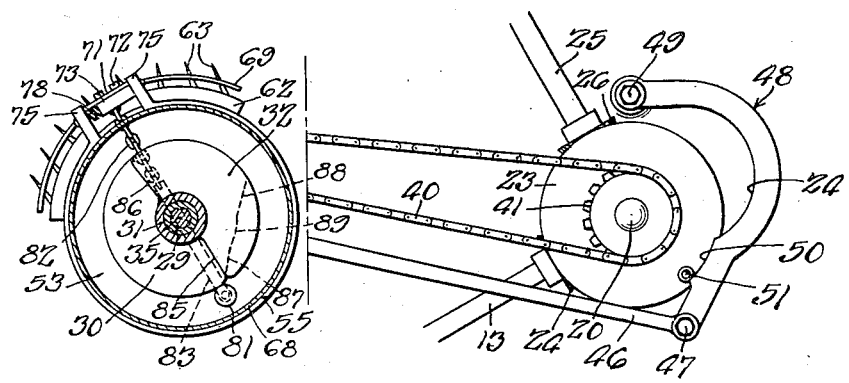
Fig. 6 is a bottom plan view of the parts in the position shown in Figs. 3 and 5, with some of the parts removed and others in cross section for the sake of clearness.
Figure 7:
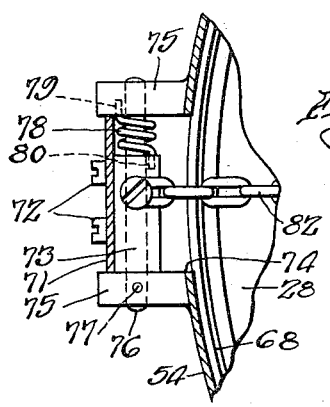
Fig. 7 is a fragmentary detail view of the connection between the fly and the fly actuating means, this view being a section taken substantially along the line 7—7 of Fig. 5.

A discharge fly is mounted on the drum and is adapted to rotate therewith. This discharge fly comprises a plate 69 which has a plurality of slots 70 therein as is best illustrated in Figs. 1 and 2. The lower end of this discharge fly has a lug 71 secured by the screws 72 to a bearing member 73 illustrated best in Figs. 5, 6, and 7. The skirt 67 is provided with a cut-away portion 74 for a purpose to appear presently, and adjacent this cut-away portion, the drum is provided with lugs 75 in which a shaft 76 is secured, the shaft 76 being prevented from rotating by the pin 77 extending through the shaft and one of the lugs. The bearing member 73 is mounted for rotation on the shaft 76 and is yieldingly urged in one direction by a coil spring 78 having one end 79 thereof arranged within one of the lugs 75, and the other end 80 thereof arranged within the bearing 73. The fly is normally rotated in a counter clockwise direction as viewed in Fig. 5 under the influence of the spring. It is adapted to be moved against the action of the spring into a vertical position as shown in Fig. 5 by the action of a cam roller 81 which engages the surface of the cam 32 as well as the cam 30, and the interconnecting means which comprises a flexible chain 82 and rod 83 which passes through and is guided by the shaft 35. The spring 78 also holds the roller 81 against the cams 30 and 32. Whenever the roller 81 is permitted to move toward the shaft 35 by the cams 30 and 32, the spring 78 will move the fly to discharge position, and since the fly is normally arranged in the position shown in Fig. 5, that is behind the slice, the slice will be discharged onto the slice receiving surface when the discharge fly is actuated. It will be understood that the cams are so arranged that the discharge fly will move into discharge position when the same is adjacent the slice receiving plate 66.

The general operation of the mechanism is as follows: As the slicing machine is driven by the motor or by hand as may be desired, a continuous rotation is imparted to the gear 23, and consequently to the roller 51. The chain 40 also moves continuously due to the fact that it is trained over the continuously rotating sprocket 41 on the shaft 20. The enlarged portion 38 therefore, driven by the sprocket 39, rotates continuously in a counter clockwise direction as viewed in Figs. 2, 3, and 4.

When the parts are in the position shown in Figs. 4 and 14, the roller 51 has just engaged the cam surface 50 on the cam arm 48, and continued rotation of the roller causes the cam arm 48 to be rocked about its pivot until the pin 36 has traveled through a little less than 180 degrees into the position shown in Fig. 15. The cam arm 48 rotates the shaft 35 at a higher speed than the speed of rotation of the enlarged portion 38, and as a result, by the time the pin 36 arrives at the position shown in Fig. 15, the enlarged portion 38 has traveled through slightly less than 90 degrees. The cam arm 48 has been rocked to its full extent by the roller 51 when the parts arrive at the position shown in Fig. 3 and also Fig. 15. As the cam roller 51 continues to rotate with the gear 23, the result is that the pin 36 remains stationary as the roller travels over the cam surface 50 which is concentric with the axis of rotation of the shaft 20. The pin 36 therefore remains stationary while the parts are in the position shown in Figs. 15, 16, 17, and 18, and remains stationary until the surface 84 at one end of the slot 37 engages the pin 36 and causes the same thereafter to rotate with the enlarged portion 38, and until the pin arrives at the position shown in Fig. 14, at which time the cycle of operation is again repeated. Fig. 19 shows the pin being driven by the enlarged portion 38. The cam arm 48 as viewed in Fig. 19, has just begun its movement inwardly toward the shaft 20.

The cams are shaped in the manner quite clearly illustrated in Figs. 8 to 13 inclusive, and in these figures the cams are shown in the positions which they occupy for the corresponding positions of the parts shown in Figs. 14 to 19 inclusive. The roller 81 which actuates the fly against the action of the spring 78 is also shown diagrammatically in these figures. Starting with the parts in the positions shown in Figs. 4, 8, and 14, the roller 81 is in engagement with both of the outer peripheries of the cams 30 and 32, the cams being shown in the positions which they occupy just prior to the accelerated movement of the drum 54. The cam 32 has substantially radially extending surfaces 85 and 86, and the cam 30 has sloping cam surfaces 87 and 88, as well as the concentric small radius cam surface 89. The angular relation of the depression in cam 30 to the slot 37 in member 38 remains constant whereby the member 38 controls the position of the depression in the cam 30. When the parts move from the position shown in Fig. 14 to that shown in Fig. 15, the cam 30 moves through slightly less than 90 degrees, but the roller 81 travels from the position shown in Fig. 8 to that shown in Fig. 9. During this accelerated movement of the roller 81 across the gap between the surfaces 87 and 88 on the cam 30, the roller is guided by the outer peripheral surface of the cam 32. When the parts arrive in the position shown in Fig. 9, the roller is free of the outer peripheral surface of the cam 32, but is now in engagement with the outer peripheral surface of the cam 30 and therefore cannot move inwardly toward the shaft 35. Continued rotation of the cam 30, however, brings the cam surface 87 adjacent the roller and as the cam 30 rotates, the roller travels down the cam surface 87 into the position shown in Fig. 10, and later into the position shown in Fig. 11, in which latter position the roller has moved inwardly toward the shaft to its full permitted extent. The fly has therefore moved outwardly its full permitted amount and is now ready to return to a vertical position to rotate with the drum. Continued rotation of the cam 30 causes the roller 81 to travel upwardly along the cam surface 88, thereby repositioning the fly in its vertical position.

As soon as the roller 81 has moved onto the outer periphery of the cam 30, the end surface 84 of the slot 37 engages the pin 36 and causes the pin 36 to rotate with the enlarged portion 38 as shown in Fig. 19, and this in turn causes the drum 54 and the roller 81 to rotate in unison with the rotation of the enlarged portion 38. These parts continue to move in unison during the impaling of the slices upon the prongs 63 and until the roller 81 again arrives at the position illustrated in Fig. 8.

If desired, a small friction brake 90 slidably mounted on a pin 91, carried by a bracket 92, and yieldingly urged toward the drum by a spring 93, may be used to engage the skirt portion of the drum and retain the drum in any position to which it is moved by either of the driving means therefor. This will prevent the drum from being rotated as the roller 81 is traveling up the incline surface 88 to position the fly in a vertical position, it being obvious that if the drum were free to rotate, the cam surface 88 might in its action upon the roller 81 cause the rotation of the drum before the fly is in a vertical position, which of course is not desired.

While it is particularly desirable to stop the rotation of the drum temporarily while the fly is discharging the slice, with a construction in which the fly moves with the drum, it will be obvious that my invention is not limited to this particular construction. One advantage of stopping the rotation of the drum while the slice is being discharged is that there is no movement of the slice in the direction in which the drum rotates, and consequently the stacker can direct the slice better than where the drum is moving. Furthermore the fly does not have to move quickly as in said copending application Serial No. 547,409, but may be more gradual. Therefore, it is not necessary to cushion the end of the discharge stroke of the fly by a brake such as shown in said copending application, as the cam surfaces may be so designed as to provide a smooth movement to the discharge fly.

It is obvious that those skilled in the art to which this invention pertains may make various changes in the construction shown in the drawings without departing from the spirit of this invention or the scope of the appended claims, and I therefore do not wish to be limited in my invention except as pointed out in the claims.

Having thus fully described my invention, what I claim as new and desire to obtain by Letters Patent is:

1. In a slicing machine, the combination with a knife, of a conveyer having a plurality of prongs thereon adapted to engage a slice after it is formed by the knife and convey the slice to a discharge position, a continuously moving driving means having a lost motion connection with said conveyer for driving said conveyer, additional means for actuating said conveyer at a speed greater than the speed at which said continuously moving means actuates said conveyer to thereby move the slice carried by the conveyer to a discharge position, said additional means being permitted to actuate said conveyer at said increased speed due to said lost motion connection which temporarily renders said first driving means inoperative without stopping the movement of the driving means itself, said conveyer having a period of rest after actuation by said additional means to permit discharge of the slice from said conveyer, and means for discharging the slice from said conveyer, said continuously moving means after taking up the lost motion in said lost motion means being active to drive said conveyer after its period of rest immediately whereafter the continuously moving driving means becomes operative to move said conveyer toward slice receiving position, and while the slice is being impaled thereon.

2. In a slicing machine, the combination with a knife, of a conveyer having a plurality of prongs thereon adapted to engage a slice after it is formed by the knife and convey the slice to a discharge position, a continuously moving driving means having a lost motion connection with said conveyer for driving said conveyer, additional means for actuating said conveyer at a speed greater than the speed at which said continuously moving means actuates said conveyer to thereby move the slice carried by the conveyer to a discharge position, said additional means actuating said conveyer at said increased speed without interference due to said lost motion connection which temporarily renders said first driving means inoperative without stopping the movement of the driving means itself, said conveyer having a period of rest after actuation by said additional means, means to discharge slices from said conveyer while said conveyer is at rest, said continuously moving means after taking up the lost motion in said lost motion means being active to drive said conveyer after its period of rest and while the slice is being impaled thereon, said discharge means being mounted to move with said conveyer.

3. In a slicing machine, the combination with a substantially cylindrical member having a slice impaling means thereon, a shaft for carrying said substantially cylindrical member and for rotating the same past the cutting edge of a slicing knife so that slices are impaled upon said impaling means as the same are formed, a continuously moving driving means for said shaft including a pin and slot connection which causes said shaft to be driven by the abutment formed by the end of the slot engaging said pin, a separate driving means for moving said shaft at a faster rate than the same is driven by said continuously moving driving means so that said pin is moved away from the end of said slot and is not driven by said continuously moving driving means, said separate driving means and continuously moving driving means being inoperative to drive said shaft after a predetermined movement of said shaft by said additional moving means whereby the shaft and the cylindrical member carried thereby remain stationary, means for discharging the slices from said impaling means while said substantially cylindrical member is stationary, said continuously moving means being operative after the discharge of said slice for moving said shaft and cylindrical member carried thereby past the edge of the knife into slice receiving position.

4. In a slicing machine, the combination with a substantially cylindrical member having a slice impaling means thereon, a shaft for carrying said substantially cylindrical member and for rotating the same past the cutting edge of a slicing knife so that slices are impaled upon said impaling means as the same are formed, a continuously moving driving means for said shaft including a pin and slot connection which causes said shaft to be driven by the abutment formed by the end of the slot engaging said pin, a separate driving means for moving said shaft at a faster rate than the same is driven by said continuously moving driving means so that said pin is moved away from the end of said slot and is not driven by said continuously moving driving means, said separate driving means and continuously moving driving means being inoperative to drive said shaft after a predetermined movement of said shaft by said additional moving means whereby the shaft and the cylindrical member carried thereby remain stationary, means for discharging the slices from said impaling means while said substantially cylindrical member is stationary, said continuously moving means being operative after the discharge of said slice for moving said shaft and cylindrical member carried thereby past the edge of the knife into slice receiving position, said means for discharging the slices comprising a discharge fly movable with said cylindrical member and pivotally mounted with respect thereto to move outwardly from said cylindrical member when the cylindrical member arrives at discharge position.

5. A device as claimed in claim 3 which includes means for retaining the substantially cylindrical member at discharge position while both of the driving means for said shaft are inoperative.

6. In a slicing machine, the combination with a slicing knife, of means for moving a substance into engagement with said knife so that slices may be cut from said substance, means for conveying slices away from the knife after the same have been cut from the substance by said knife, comprising a rotating member carrying a plurality of slice engaging prongs, a rotatable shaft for supporting said member, intermittently operating means for operating said shaft a continuously moving means for continuously moving said shaft, means for automatically bringing either of said means into operative driving relation for driving said shaft, said intermittently operating driving means being constructed to drive said shaft at a greater speed than said continuously moving means, a discharge fly carried by said shaft for discharging the slices from said impaling means, a cam concentrically mounted with respect to said shaft for actuating said discharge fly in one direction, means for moving said discharge fly in the opposite direction, and means for bringing said shaft to rest at a predetermined position so that slices may be discharged therefrom while said shaft is at rest.

7. In a slicing machine, the combination with a slicing knife, of a reciprocating table for presenting a substance to be sliced to said knife, means for driving said knife and table, and slice conveying and discharging means for conveying slices away from said knife as they are formed, and for discharging said slices at a predetermined position, comprising a shaft, a rotatable sleeve in which said shaft is journaled, a slot in said sleeve, a pin in said slot secured to said shaft to permit limited relative movement between said shaft and sleeve, a continuously moving means for actuating said sleeve and as a result rotating said shaft due to the engagement of one end of said slot with said pin on said shaft, a crank on said shaft secured thereto, intermittently operated means for rotating said crank and consequently said shaft in the same direction as said continuously moving means and at a greater rate of speed than that at which said shaft is actuated by said continuously moving means so that said pin is moved toward the opposite end of said slot and is out of engagement with the first end of said slot and cannot be driven thereby, said shaft coming to rest after a predetermined movement of said intermittently operating means thereby stopping said pin and shaft, and after continued movement of said sleeve the driving end of said slot is brought against said pin to drive said shaft, a slice impaling means carried by said shaft and rotating therewith at the same speed as said shaft and coming to rest at the same time as said shaft, and means for discharging the slices from said impaling means when said shaft and impaling means are at rest at a discharge position, said impaling means being operative while in motion past said knife to receive a slice being formed thereby and convey the same to said discharge position.

8. In a slicing machine, the combination with a slicing knife, of a reciprocating table for presenting a substance to be sliced to said knife, means for driving said knife and table, and slice conveying and discharging means for conveying slices away from said knife as they are formed, and for discharging said slices at a predetermined position, comprising a shaft, a rotatable sleeve in which said shaft is journaled, a slot in said sleeve, a pin in said slot secured to said shaft to permit limited relative movement between said shaft and sleeve, a continuously moving means for actuating said sleeve and as a result rotating said shaft due to the engagement of one end of said slot with said pin on said shaft, a crank on said shaft secured thereto, intermittently operated means for rotating said crank and consequently said shaft in the same direction as said continuously moving means and at a greater rate of speed than that at which said shaft is actuated by said continuously moving means so that said pin is moved toward the opposite end of said slot and is out of engagement with the first end of said slot and cannot be driven thereby, said shaft coming to rest after a predetermined movement of said intermittently operating means thereby stopping said pin and shaft, and after continued movement of said sleeve the driving end of said slot is brought against said pin to drive said shaft, a slice impaling means carried by said shaft and rotating therewith at the same speed as said shaft and coming to rest at the same time as said shaft, and means for discharging the slices from said impaling means when said shaft and impaling means are at rest at a discharge position, said impaling means being operative while in motion past said knife to receive a slice being formed thereby and convey the same to said discharge position, said discharge means being carried by said shaft and rotating therewith and with said impaling means.

9. A device as claimed in claim 7 in which said continuously moving means comprises an endless chain driven by the means which actuates said table and in which said intermittently operated means comprises a pivoted arm rocked about its pivot by a means moving with the driving means for said table, and a link which connects said crank and said arm.

10. A device as claimed in claim 8 in which the discharge fly is yieldingly urged into discharge position and is held and moved away from discharge position by means of a cam having relative movement with respect to said shaft while said shaft is at rest and in which there is an interconnecting means between said cam and said discharge fly for moving said discharge fly against the action of said spring.

11. A slice conveyer and stacking mechanism comprising a member having slice impaling means thereon, a discharge fly normally urged into discharge position by a spring, said discharge fly moving with said member, a pair of cams one of which is stationary, and each of which has a concentric surface thereon at substantially the same distance from their axes, a roller on said conveyer adapted to engage and rotate about both of said cams during a complete cycle of movement for said conveyer, a connecting means between said fly and said roller, a shaft carrying said member, said member rotating with said shaft, means for driving said shaft at one speed while the slice is being received by said impaling means, and means for driving said shaft at a higher rate of speed after the slice is impaled on said impaling means, a depression in one of said cams, said spring actuating said fly to move said roller into said depression, sloping surfaces on said last mentioned cam on opposite sides of said depression so that said roller will move into and out of said depression as the shaft rotates, the other of said cams having the said concentric surface thereof periodically brought into a position adjacent said depression to prevent the movement of said roller into said depression and permit said roller to be moved from one side of said depression to the other side thereof as it moves with said conveyer so that the same will be in a position to move into said depression from the same side of said depression on each successive movement of said roller into said depression and after the movement of said member at said increased speed.

12. In a conveying means for conveying slices after they are formed to a discharge position and for discharging slices at that position, the combination with a movable slice holding element adapted to be moved from a position adjacent the knife to a position remote therefrom and back again in a continuous circuit, said means moving always in the same direction, of driving means for driving said element comprising an operating shaft adapted to be continuously rotated, a driving connection from said continuously rotating shaft having operative driving engagement with a rotatable member to continuously rotate the same, a lost motion connection between said member and said element for normally driving said element when the lost motion in said connection is taken up, an intermittently actuated member for imparting to said element a speed greater than the speed of movement imparted thereto by said member without disturbing the continuous rotation of said member since the lost motion connection compensates for the difference in movement of said member and element under the driving influence of said intermittently operated member, and also enables said element to remain at rest after said intermittently operated member comes to rest and until the lost motion in said lost motion connection is taken up to permit the discharge of a slice from said element while said element is at rest and while the lost motion in said lost motion connection is being taken up, immediately whereafter the continuously operated member becomes operative again to drive said element and return said element to slice engaging position in time to receive the next slice being formed.

13. A device as claimed in claim 12 in which said intermittent operating member is cam actuated by a cam mounted to move in synchronism with the rotation of said operating shaft whereby said element comes to rest at the same position on successive operations of said element.

14. A slice conveying means for receiving slices from a knife as they are being formed and for conveying them thereafter to a discharge position comprising a driving element, a shaft driven by said driving element, a support for said shaft, an upwardly extending flange on said support, a drum carried by said shaft having a downwardly depending skirt embracing said flange, a discharge fly for moving slices off said drum onto a slice receiving surface, and operating mechanism for controlling said discharge fly arranged within said drum and protected by said skirt and flange against foreign matter.

15. In a slice conveying and discharge means for slicing machines, the combination with a conveying element movable always in the same direction, a driving means for said conveying means, a discharge fly, a cam for actuating said discharge fly having a cam depression therein, means normally urging said discharge fly into a discharge position, a roller operatively connected to said discharge fly and normally engaging a portion of said cam which prevents movement of said discharge fly to an inoperative position, said cam having a depression therein into which said roller may move, means for moving said roller into said depression when the latter is opposite said depression whereby said discharge fly will move to a discharge position, and a second cam actuated by said conveyer for moving said roller out of said depression after the slice has been discharged.

16. In a slicing machine the combination with a slicing knife of a rotary drum rotatable in one direction only, having prongs projecting therefrom for engaging slices as the same are formed from a substance being sliced by said knife and for conveying the slices to a discharge position, means for returning said prongs to receive successive slices as the same are formed, and a discharge fly for discharging the slices from said prongs onto a slice receiving surface at said discharge position, two different means for driving said drum, and means for alternately and periodically bringing one or the other of said driving means into operation to actuate said drum, one of said driving means actuating said drum at a substantially uniform speed while the slice is being impaled on said prongs and the other of said driving means actuating said drum at a higher rate of speed after the slice is impaled on said prongs to quickly move said slice to said discharge position.

17. In a slice conveyer and stacking mechanism comprising a member having slice holding means thereon, a discharge fly normally urged toward discharge position by a spring and moving with said member, a pair of cams, one of which is stationary and the other which is movable, each having concentric surfaces thereon at substantially the same distance from their common axes of rotation and a cam engaging member operatively connected to said discharge fly and adapted to engage and rotate about both of said cams during a complete cycle of movement for said conveyer, a connecting means between said fly and said cam engaging member, a shaft carrying said first mentioned member and rotating therewith, means for driving said shaft at one speed while the slice is being received by said slice holding means, means for driving said shaft at a higher rate of speed after the slice is engaged and held by said holding means, a depression in one of said cams, said spring actuating said fly to move said cam engaging member into said depression, sloping surfaces on said last mentioned cam on opposite sides of said depression so that said roller will move into and out of said depression readily as the shaft rotates, the other of said cams having the said concentric surface thereof periodically brought into position adjacent said depression to prevent the movement of said cam engaging member into said depression and permit the same to be moved from one side of the said depression to the other side thereof as said cam engaging member moves with said conveyor, whereby the same will be positioned always at the same side of said depression prior to each successive movement of said cam engaging member into said depression so that said cam engaging member moves always into said depression from the same side of said cam having the depression therein.

18. In a slice conveying and discharge means for slicing machines, the combination with a conveying element movable always in the same direction, a driving means for said conveying means and discharge fly, a cam for actuating said discharge fly having a cam depression therein, means normally urging said discharge fly into a discharge position a cam engaging member operatively connected to said discharge fly and normally engaging a portion of said cam, which prevents movement of said discharge fly to an inoperative position, said cam having a depression therein into which said cam engaging member may move, means for moving said cam engaging member into said depression when the latter is opposite said depression, whereby said discharge fly will move to a discharge position, and a second cam actuated by said conveyer, for moving said cam engaging member out of said depression after the slice has been discharged by said discharge fly.

19. A slicing machine comprising a rotary knife, a carriage reciprocal past the cutting edge of the knife, a support, a drum on said support, impaling means on the drum, a discharge fly adjacent the drum and also mounted on the support, means for rotating said support and drum always in the same direction to impale a slice, means for momentarily stopping the drum at the discharge position, means for operating the fly when the drum has momentarily stopped, and means for accelerating the support to increase the speed of the drum immediately after a slice is impaled.

CORNELIS F. M. van BERKEL.